March 31, 1942.  J. J. CORDOVA  2,278,246
VALVES AND THE LIKE
Filed March 2, 1940  3 Sheets-Sheet 1
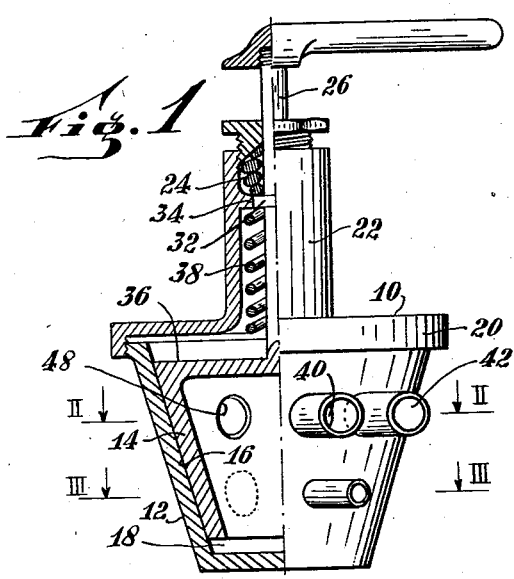
Fig. 1
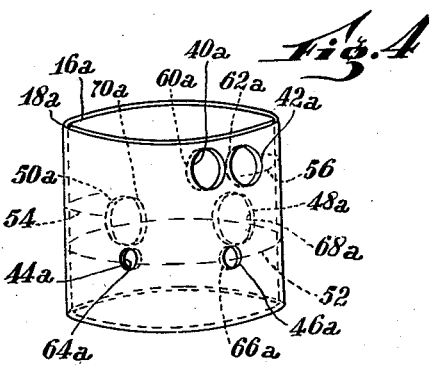
Fig. 4
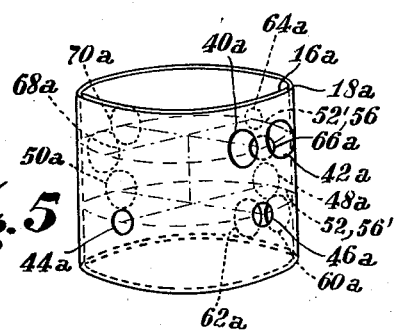
Fig. 5
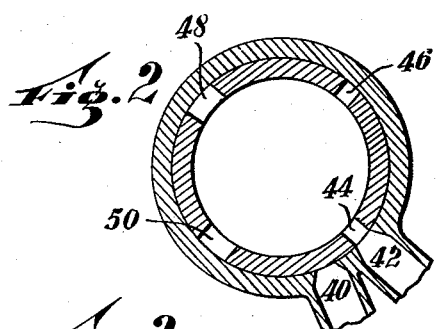
Fig. 2
Fig. 3
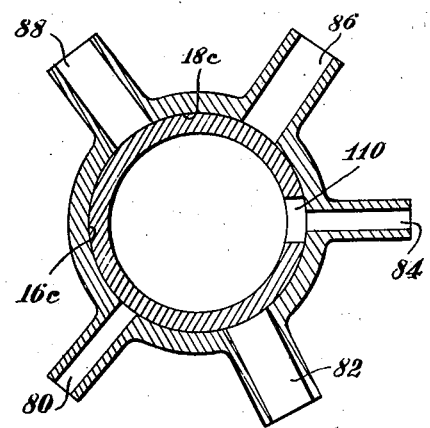
Fig. 6
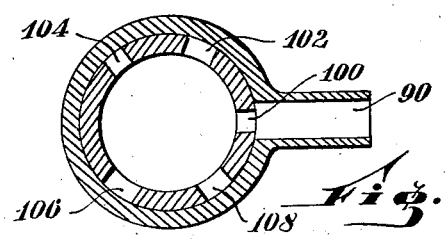
Fig. 7
INVENTOR
JOSE JUAN CORDOVA
BY
Young, Emery & Thompson
ATTORNEYS March 31, 1942.  J. J. CORDOVA  2,278,246
VALVES AND THE LIKE
Filed March 2, 1940  3 Sheets-Sheet 2

INVENTOR
JOSE JUAN CORDOVA
BY
Young, Emery & Thompson
ATTORNEYS

March 31, 1942.  J. J. CORDOVA  2,278,246
VALVES AND THE LIKE
Filed March 2, 1940   3 Sheets-Sheet 3
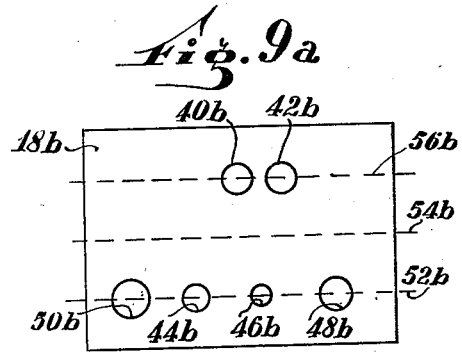
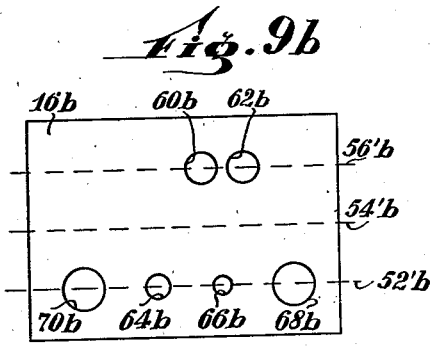
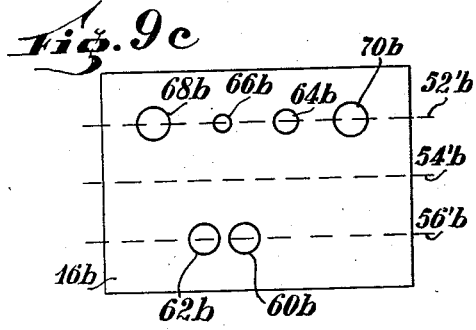
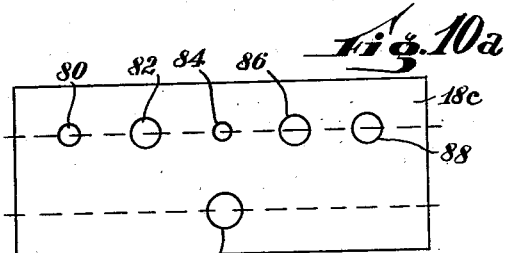
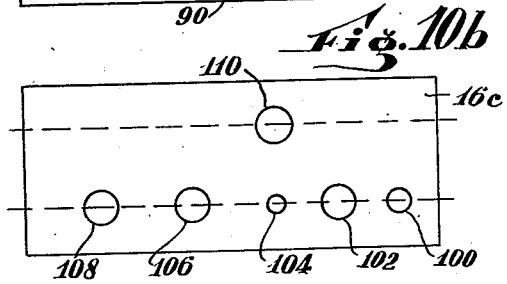
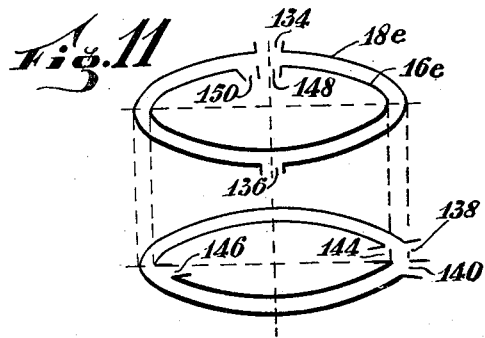
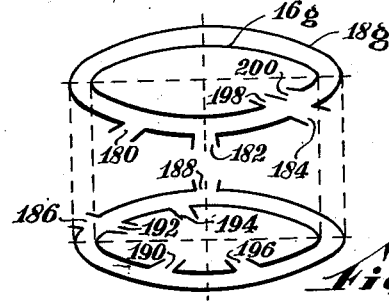
INVENTOR
JOSE JUAN CORDOVA
BY
Young, Emery & Thompson
ATTORNEYS Patented Mar. 31, 1942

2,278,246

UNITED STATES PATENT OFFICE 2,278,246

VALVE AND THE LIKE

José Juan Cordova, Buenos Aires, Argentina

Application March 2, 1940, Serial No. 321,987
In Argentina December 21, 1937

3 Claims. (Cl. 251—106)

The present invention relates to valves, of the type used for the control of fluid supply systems. More particularly, the invention relates to a multiway valve for controlling and/or directing and/or mixing a plurality of streams of fluid. The plurality may occur on the inlet side, or the outlet side of the valve or on both. Thus, for example, the valve may be used to direct one of a plurality of incoming streams selectively to one outlet, or one incoming stream selectively to each of a plurality of outlets, or to combine a plurality of incoming streams in varying proportions and direct the resultant selectively to each of a plurality of outlets.

It is to be understood that it is not essential to the present invention that all of these features be combined in one single valve unit, but that, on the contrary, the basic principles underlying the present invention admit of the construction of a very large number of variants, so that any problem connected with the control and distribution of streams of fluids in pipe-lines and the like may be solved.

The essential features are best explained and understood in and from the detailed description hereinafter given, but it may be stated broadly that my novel valve comprises a valve housing having a bearing surface and a relatively movable valve body having a contact surface adapted to bear against said bearing surface, which has a plurality of ports at least some of which form a group, the members of which are spaced along a straight line lying on said bearing surface, said contact surface having a plurality of openings at least some of which form a set the members of which are spaced along a straight line lying on the contact surface, the spacings of said openings in the set being equal in magnitudes but reverse in order as compared with that of said ports in said group. A straight line means in this specification the shortest distance on the surface, whether curved or plane, between two points thereon. For simplicity this relationship between the ports of a group and the openings of a corresponding set will hereinafter be referred to as one of counterdirectional equality and such corresponding groups and sets will be designated as counterdirectionally equal.

A plurality of groups and/or sets may be provided and the sets may be spaced from their counterdirectionally equal groups in a direction at right angles to the line of the set. Furthermore one or more ports or openings extraneous to the group or set may be provided along the line of the group or set at either end thereof, and such additional ports or openings will hereinafter be referred to as non-included ports or openings.

The area of the bearing or contact surface extending along a line of ports or openings and including these, will hereinafter be denominated a port or opening bearing zone, and any alinement of ports or openings along a port or opening bearing zone irrespective of whether it has a counter-directionally equal alinement of openings or ports or not, will be referred to generally as a row of ports or openings. It is to be understood that all alinements are to be regarded as parallel to the lines of counterdirectionally equal groups and sets, and that a port or opening bearing zone, or in more general terms, a passage bearing zone, may contain a plurality of passages or only one passage. The term "passage" is used to refer indifferently to ports or openings.

It will be obvious that for each port bearing zone there must be an opening bearing zone co-operating therewith in such wise that at least some of the openings can be made to coincide successively or simultaneously with at least some of said ports.

For certain purposes as will hereinafter be more fully explained, some of the ports and/or openings may be made as contiguous as is consistent with material separation, thereby enabling one or other of a like number of streams of fluid to be passed through a specific opening or port, or controllable proportions of the streams to be passed through the same opening or port, by bringing contiguous openings opposite a a single port or a single opening opposite contiguous ports.

In certain other cases, the distance between two successive ports or openings in a given passage bearing zone must differ from the distance between two successive openings or ports of the co-operating passage bearing zone, by an amount equal to the width of a port or opening measured along said zone.

The invention may be embodied as a slide valve or as a rotary valve, and in the latter case, the bearing and contact surfaces, may be cylindrical or hemispherical, or, preferably frusto-conical.

In the drawings:

Fig. 1 is a part-sectional elevation of a rotary valve according to the present invention.

Figs. 2 and 3 are respectively cross-sections on the lines II—II and III—III of Fig. 1.

Figs. 4 and 5 are illustrative diagrams of idealised cylindrical bearing and contact surfaces with port and opening arrangements as in Figs. 1 to 3.

Figs. 6 and 7 are sections corresponding to those of Figs. 2 and 3, but with a different arrangement of ports and openings.

Fig. 9a is a diagram of an ideal bearing surface and Fig. 9b of an ideal contact surface which are developments of those shown in Fig. 4.

Fig. 9c is a diagram of the contact surface of Fig. 9b after inversion.

Figs. 10a and 10b are diagrammatic bearing and contact surfaces for slide type valves with a different arrangement of ports and openings, and Figs. 11, 12, 13, 14, 15 and 16 are diagrams of cylindrical bearing and contact surfaces with varying arrangements of ports and openings.

Figure 8:
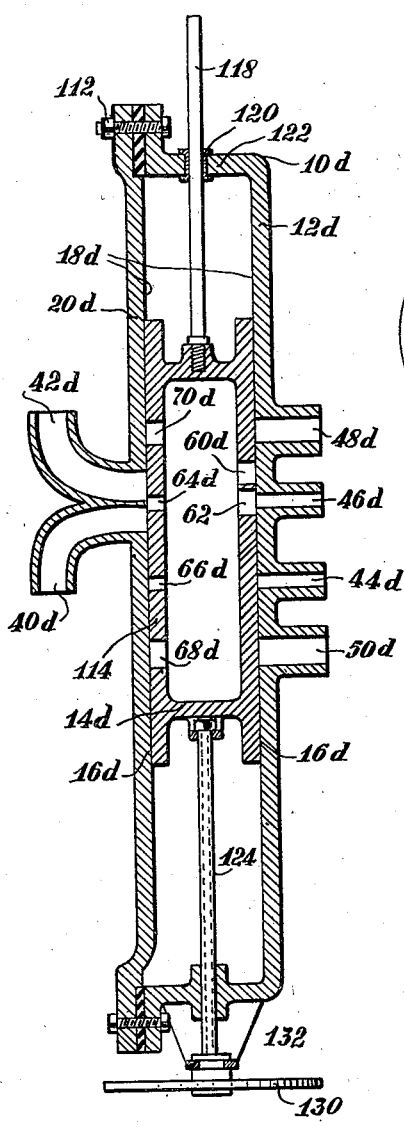
Fig. 8 is a longitudinal section of a slide type valve according to the present invention.

With reference to the drawings, and particularly to Figs. 1 to 5, the present invention may, by way of example, be embodied in a hot and cold water distributing and mixing valve indicated generally by the reference 10 having a housing 12 in which a frusto-conical valve-body 14 is rotatably mounted so that the contact surface 16 of the valve-body is in intimate contact with a bearing surface 18 of the housing 12. Said housing is provided with a deteachable cover 20, which, as shown, may be screwed onto one end of said housing, and which has an elongated neck portion 22, terminating at its free end in a gland 24, through which a stem 26 projecting from the valve-body passes.

Preferably the stem 26 is provided at a point intermediate of its ends with a collar 32 adapted to abut against an internal projection 34 of the neck portion 22, and between the projection 34 and the upper portion 36 of the valve body 14, a spring 38 may be located to urge the valve body inwardly of the housing 12 that is to say, towards the smaller end thereof, in order to ensure a tight fit of the valve-body against the bearing surface 18. The purpose of the collar 32 is to prevent the user of the valve from unseating the valve body 14 when readjusting the setting. It will be obvious to those skilled in the art that this construction may be modified in a variety of ways and that the parts so far described are in general known in valves, faucets and the like.

The mixing and distributing valve shown in Figs. 1 to 3 has a pair of adjacent inlet ports, one of which 40 is intended say for hot water and the other of which 42 for cold water supply; the centers of these adjacent inlet ports lie on a plane perpendicular to the axis of rotation of the valve body and the trace of this plane on the valve body is a circle on which lie the centers of a plurality—in the present instance four—of inlet openings 44, 46, 48 and 50 (Fig. 2). In the example illustrated, two of said openings 44 and 46 are smaller than the other two 48 and 50 say the openings 44 and 46 are half-inch whereas the others are three-quarter inch. They are distributed about the circle in a manner to be hereinafter described, but the angular distance between like edges of two successive openings must not be less than the angular distance between the outer edges of the pair of inlet ports, the measurements being taken on the trace of said perpendicular plane. In this way, it is impossible to present two of said openings 44, 46, 48 or 50, simultaneously to the pair of inlet ports, while, however, any one of said openings may be presented wholly or partially to one or other of said inlet ports 40 or 42 or to both simultaneously with varying aperture for each. Thus it is possible to allow a quantity of hot water to pass from port 40 through say opening 44, or a quantity of cold water to pass through the same opening from port 42 (position shown in Fig. 2) or quantities of both hot and cold water may be permitted to pass simultaneously through opening 44, the quantities in each case depending on the effective aperture resulting from the overlap of the opening of the ports.

To these ends, there must be communication internally of the valve body 14, between at least some of the openings thereof. Generally, and as shown in the drawings, the valve body is hollow so as to allow of all possible combinations between communicating openings. In some instances, as for example in the embodiment illustrated in Fig. 14 to be described later, the ducts may be provided through a solid valve body so as to establish certain specific communications or because the distribution of the openings and ports permits all the openings to be connected by ducts. The ducts are advantageous when their use is feasible because they eliminate the relatively large internal space which would be filled by the fluid passing through the valve and might have to be emptied by running to waste so as to avoid contamination.

About the trace on the valve body of a second plane parallel to the first a plurality of outlet ports 64, 66, 68 and 70 are provided corresponding in number and kind to the openings 44, 46, 48 and 50 of the valve body 14 but distributed about their trace in such a manner that the successive angular distances between the ports measured in one sense round said trace are equal to and correspond with the successive angular distances between the openings 44, 46, 48 and 50 measured in the contrary sense around their respective trace. This relationship may be stated alternatively as one of counter directional equality as hereinbefore defined, if the aforesaid trace be considered, as it can be, as a straight line on the surface of the frusto-conical parts. As can be seen by reference to Fig. 8, and as will be more fully explained hereinafter, the bearing and contact surfaces of the embodiment of Fig. 1 can be developed into the plane form to give the same relationship between the passages and the same practical results in a slide type of valve.

This distribution may also be considered as produced in the manner shown in Figs. 4 and 5. In Fig. 4, two concentric cylinders 18a and 16a, the outer one representing the bearing surface and the inner one the contact surface are pierced simultaneously to provide coincident pairs of perforations 44a, 64a, 46a, 66a, 48a, 68a and 50a, 60a disposed in any desired angular distribution about the trace 52, of a plane perpendicular to the common axis of the cylinders. In Fig. 5, the same two cylinders are shown but the inner cylinder has been inverted. If the plane corresponding to the trace 52, which is imagined to be on the surface common to the two cylinders, is not the median plane between the ends of the cylinders, the inversion will give rise to a separation between the group of perforations or ports 44a, 46a, 48a and 50a of the outer cylinder 18a and the perforations (or openings) 64a, 66a, 68a and 70a of the inner cylinder 16a, but in any event will cause a counterdirectional equality in the distribution of the perforations about the respective traces.

So far as the angles or distances between perforations are concerned, if the original distribution (in Fig. 4) is symmetrical about any diameter, there will upon inversion be no change and it will be indifferent in which sense the angles or distances are measured along the two traces. It will not, however, be indifferent if there was asymmetry of distribution originally, with respect to the size of the perforations. Consequently, it may reasonably be said that the case of symmetry both as to angles or distances and sizes in the original distribution must be considered as included in the scope of the present invention as a limiting case.

Returning now to Fig. 4, it will be seen that in this example the pairs of coincident perforations are disposed about a trace 52 which lies between the median trace part of which is indicated at 54 and one end of the cylinders. Along another trace 56 which lies at a distance from the median trace 54 equal to the distance between the latter and the first trace 52, other pairs of perforations, for example the adjacent pairs 40a, 60a, and 42a, 62a are formed at any point on said other trace 56. In this event it is a condition that the distance between any two of the perforations along the trace 52 must at least be equal to twice the width of one of the perforations of trace 56 the measurements being made along the traces.

On inversion of the inner cylinder (Fig. 5) the trace 52' corresponding to the perforations 64a, 66a, 68a and 70a will coincide with the trace 56 corresponding to the adjacent pair 40a, 42a on the outer cylinder and the trace 56' corresponding to the adjacent pair 60a, 62a on the inner cylinder will coincide with the trace 52 corresponding to the perforations 44a, 46a, 48a and 50a of the outer cylinder.

The effect of this inversion can best be seen by comparing Figs. 9a, 9b and 9c which are plane developments of the cylindrical bearing and contact surfaces 18a and 16a. Fig. 9a shows the developed bearing surface 18b having a group of ports 50b, 44b, 46b, 48b spaced along a line 52b and a second group consisting of an adjacent pair of ports 40b, 42b formed on a line 56b an equal distance from the longitudinal median line 54b of the surface 18b. If the ports are formed by perforation and the contact surface 16b (Fig. 9b) was superposed at the time on the bearing surface 18b the contact surface will show similar sets of openings, one including the openings 70b, 64b, 66b and 68b on line 52'b and the other including the adjacent pair 60b, 62b. In Fig. 9c the contact surface 16b has been invested by turning through two right angles in its own plane so that its two sets of openings have been brought into counter directional equality with the corresponding groups of ports of surface 18b. It will be noticed that the set formed by the four openings 68b, 66b, 64b and 70b would on superposition of the two surfaces co-operate with the group of adjacent ports 40b and 42b and that the set of adjacent openings 62b, 60b would co-operate with the group of four ports 50b, 44b, 46b and 48b. It will further be observed that in the condition of superposition the line joining any two openings selected one from each set is parallel and equal to the line joining corresponding ports selected one from each group. Thus a line joining the centers of openings 62b and 64b is parallel and equal to the line joining the ports 44b and 42b. This is so because the ports and openings were formed by simultaneous perforation of the two surface and on inversion of one the joining lines were merely turned through two right angles so that only their sense but not their direction or length has been altered.

Hence with an arrangement of ports and openings such as that shown in Figs. 4, 5, 9a, 9b and 9c, it will always be possible to cause an opening of one set to coincide with a port of the co-operating group while causing an opening of the second set to coincide with a port of the group co-operating therewith. If there are differences as between group and group, set and set or group and set, the results obtained by causing the same opening of one set to coincide successively with the ports of the co-operating group will differ. These observations apply to all possible distributions of ports and openings provided there is at least one row of passages on one surface at least a part of which is in counterdirectional equality with another row on the other surface.

Whether when a passage of one row coincides with a passage in the co-operating row, one or more passages in a second row will coincide wholly or partially with one or more passages in the second co-operating row will depend on the relative distances between passages in their rows as between row and row.

In practice, conditions and the purpose for which the valve is to be used will determine whether plural coincidences in different rows are desirable. It must also be remembered that, in general, an off position in which no opening coincides with any port is desirable and this will further condition the distribution of the passages.

In the example of Figs. 4, 9a and 9c, an off position can be obtained if the distance between two successive ports on the line 52a or 52b is not less than the sum of the widths of the adjacent ports plus the amount of their separation, and off position is obtained between any two successive ports of line 52a or 52b if the above condition is applied to any two successive ports on said line.

Figs. 6 and 7 show sections of a valve similar to that of Fig. 1, but having passage distributions as shown in Figs. 10a and 10b.

In this instance the bearing surface 18c has an upper row formed by a group of five ports 80, 82, 84, 86 and 88 and a lower row comprising one port 90 and the contact surface 16c has an upper row comprising one opening 110 and a lower row formed by a set of five openings 100, 102, 104, 106 and 108 counterdirectionally equal to the group of the upper row on the bearing surface. This arrangement, which as indicated includes ports and openings of differing apertures, may be used either as a distributing valve for directing one current of fluid selectively to five different points or as varied delivery valve for directing five different currents of fluid selectively to one point.

This arrangement as well as others which will be described hereinbelow is applicable also to a slide valve for example to the valve shown in Fig. 8 which has ports and openings distributed as in Figs. 5, 9a and 9c.

The slide valve shown in longitudinal section in Fig. 8 has a housing 10d comprising a main portion 12d and a cover portion 20d secured to the main portion as by bolts 112. The cover portion has a pair of adjacent inlet ports 40d, 42d co-operating with a set of openings 68d, 66d, 64d, 70d formed on one face 114 of a hollow slide body 14d, the other face 116 of which has a pair of adjacent openings 62d, 60d which co-operate with ports 50d, 44d, 46d, 48d on the main portion 12d. The slide body 14d has a guide rod 118 extending through a bushing 120 on one end wall 122 of the main portion 12d of the housing and an actuating screw 124 extending through an internally threaded boss 126 on the opposite end wall 128 of said main portion. The actuating screw may be passed through a hand wheel 130 rotatably secured to a suitable member 132 projecting from said main portion 12d. The auxiliary constructional details such as the means for securing the housing portions together, and the actuating means for the slide may be of any suitable type and the present invention is not to be regarded as limited thereto. For simplicity the free ends of the ports are shown plain in the drawings but it will be understood that they are intended to have coupled to them feeding or outlet pipes which may be joined to the ports in any of the several ways known in the art.

Fig. 11 shows ideally another arrangement of passages as applicable to a rotary valve having a cylindrical (or frusto-conical) valve body. The bearing surface 18e has an upper group of the two diametrically opposite ports 134, 136 and a lower group of two adjacent ports 138, 140 which are located so that the radius cutting the center point of the material separating the ports 138, 140 runs at right angles to the diameter joining the centers of the ports of the upper group.

The contact surface 16e has an upper set of adjacent openings 148, 150 counterdirectionally equal to the lower group of the bearing surface and a lower set of two diametrically opposite openings 14, 146 counterdirectionally equal to the upper group of ports. In the figure the two surfaces are shown in one operative position with opening 144 opposite port 134 and opening 148 opposite port 138. The arrangement is suitable for delivering two different streams of fluid (e. g. hot and cold water, or hydrogen and crude oil) either separately or mingled to two different points selectively. If on the figure the contact surface be imagined rotated clockwise through half the width of a passage, approximately a half each of openings 150 and 148 will come opposite port 134 which may be regarded as a delivery port, and opening 144 will come midway between the adjacent ports 138, 140 which may be regarded as inlet ports. Thus a mixture of equal proportions of the fluid entering through port 138 and of that entering through port 140 will be delivered through port 134. A further rotation of 180° of the contact surface 16e will produce similar conditions for port 136 since opening 146 will then co-operate with the adjacent ports 138, 140.

In Fig. 12 is shown still another arrangement in which, however, there is only one group for which there is a counterdirectionally equal set although there are two planes or rows of passages on both the bearing and the contact surfaces.

In this example the contact surface 16f is shown in relation to the bearing surface 18f as if the former had been merely inverted without rotation about its axis. There are four ports 152, 154, 156 and 158 in the upper row, forming diametrically opposite pairs 152, 156 and 154, 158 the center lines of which are at right angles to each other. Similarly there are four openings 162, 164, 166, 168 in the lower row of openings which are disposed in counterdirectionally equal relationship with respect to the upper row of ports to form diametrically opposite pairs 168, 164 and 156, 152. It will be noted that the counterdirectionally equal set is spaced from the corresponding group in a direction at right angles to the line of the set.

The lower row of ports comprises two ports 160 and 170 which are each displaced half a port width on the same side of a diameter. The upper row of openings consists of a pair of adjacent openings 172, 174 the division between which is vertically above the center of one of the openings of the lower row, for example, the opening 168. Thus each of these adjacent openings is displaced half an opening width to one side of a diameter but at the same end thereof so that one of the pair lies to one side and the other to the other side of said end.

Consequently, if as shown in the drawings, the division between the adjacent openings 172, 174 is opposite the mid point of one of the co-operating ports, say port 158, the counterdirectionally equal openings will, since the distribution of the ports in the group and the openings in the set is symmetrical, lie vertically below the corresponding ports. For example, opening 168 will lie vertically below port 158, and opening 164 will be vertically below port 154. Since the lower ports 160, 170 are displaced half a port width as described and in this case all the passage widths are equal, half the aperture of opening 168 will coincide with half the aperture of port 160 and half the aperture of opening 164 will coincide with half the aperture of port 170. Therefore, half the volume of fluid entering port 158 will be delivered through port 160 and the other half through port 170. Successive rotations of the contact surface 16f through 90° clockwise from the position shown in the drawings, will cause fluid coming in through ports 152, 154 and 156 to be delivered half through port 170 and half through port 160. In any of these positions a further rotation through a half passage width will select port 160 or 170 for delivery of the whole of the incoming fluid according to whether the additional rotation is clockwise or the reverse.

The diagram of Fig. 13 provides an example of an arrangement in which a row comprises a set counterdirectionally equal to a group, and a non-included opening. Thus the upper row on the bearing surface 18g consists of a group of three ports 180, 182 and 184 the outer two 180 and 184 being equidistant from the center port 182. The lower row consists of two ports 186, 188 one of which is located at a point on the lower row diametrically opposite to the projection thereon of one of the ports, for example, the center port 182 of the upper row, and the other of which is spaced along the lower row a distance equal to the distance between two successive upper ports plus one port width.

The contact surface 16g has a lower row comprising a set of openings 190, 192, 194 counterdirectionally equal to the group of ports in the upper row of the bearing surface, and a non-included opening 196 spaced from one end of said set a distance equal to the distance between two successive openings of the set. The upper row on the contact surface consists of a pair of adjacent openings 198, 200, so disposed that the center of the division between them is spaced from the projection on the upper row of the opening of the lower row furthest from the non-included opening a distance equal to half the circumference of the contact surface less twice the distance between two successive openings in the lower row.

This construction allows fluids supplied to ports 180, 182 and 184 to be delivered selectively to one or other of the ports 186 or 188 or inversely it permits one or other of two streams supplied to ports 186 and 188 to be delivered selectively through one of ports 180, 182, and 184. In the position shown, fluid entering by port 184 passes through opening 198 and thence internally of the contact surface to opening 192 and out through port 186. If the contact surface is rotated clockwise in the figure through a port width, port 184 is connected to port 188 through openings 200 and 194.

Figure 14:
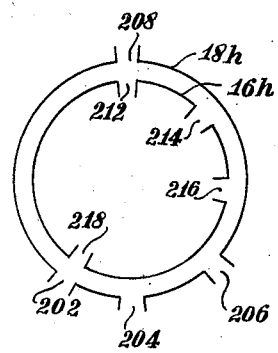
Figure 15:
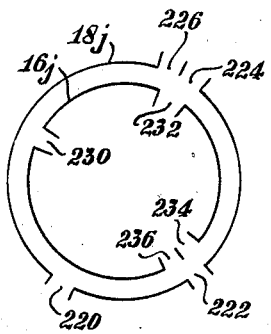

In Figs. 14 and 15 two different arrangements are shown in each of which there is only one row of ports and one row of openings. In Fig. 14, these rows comprise a group of ports 202, 204, 206 and 208 formed on the bearing surface 18h and a counterdirectionally equal set of openings 212, 214, 216 and 218 formed on the contact surface 16h. The group and set each comprise a pair of diametrically opposite passages, for example the ports 204 and 208 and the openings 214 and 218, and a passage for example the ports 202, 206 and openings 212, 216 on either side of one of said diametrically opposite passages and spaced therefrom a distance not exceeding a quarter of the circumference. The arrangement is used with the solitary opening 218 co-operating with the associated ports 202, 204, 206 so that the associated openings 212, 214 and 216 co-operate with the solitary port 208, either to direct individually fluid streams entering through the associated ports to the solitary port or to direct one stream entering through solitary port 208 selectively to each of the associated ports 202, 204 and 206.

This arrangement of ports and openings may be modified by adding ports and openings equally spaced on either side of the solitary port and opening 208, 218 to form a subgroup or subset similar to the subgroup or subset constituted by the associated ports and openings 202, 204, 206 and 212, 214, 216. If the solitary port or opening be likewise considered as a subgroup or subset, the general condition for satisfactory distribution may be stated as being that the distance between proximate extremes of the subgroups or subsets must be greater than the distance between the ports or openings of the subgroups or subsets by at least one passage width. The separation of the passages within their respective subgroups or subsets will depend upon the routing or distribution it is desired to give to the current of fluid.

In Fig. 15 a passage distribution is shown whereby one or other or both of two streams of fluid may be directed alternatively through one or other of two spaced outlets, or one or other but not both of two streams of fluid may be directed to one or other or to both simultaneously of two adjacent outlets.

To these ends, the bearing surface 18j has a pair of spaced ports 220, 222 and a pair of adjacent ports 224, 226 and the contact surface has a counterdirectionally equal set of openings comprising a pair of adjacent openings 236, 234, and a pair of spaced openings 232, 230. The general condition for this arrangement is that the distance between the center of the division between the adjacent passages and the center of one of the spaced passages must be one half of a passage width less than the distance between the center of said division and the center of the other spaced passage. Furthermore, the arrangement will be satisfactory provided that the distance between the center of said division and the center of the nearest spaced passage is not less than two and one half passage widths and the distance measured so as to exclude the adjacent pair between the centers of the spaced passages is not less than three times a passage width.

Figure 16:
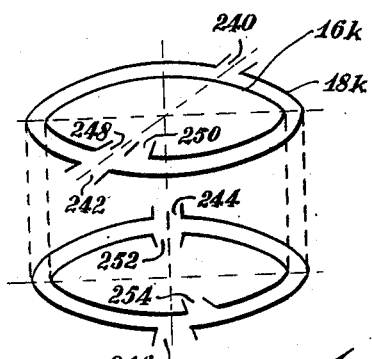

Finally, in Fig. 16 is shown an arrangement in which the upper row of the bearing surface 18k comprises a pair of diametrically opposite ports 240, 242 and the lower row consists of a second pair of diametrically opposite ports 244, 246 the diameter joining them being skew to the diameter joining the first-mentioned pair. The upper row of openings on the contact surface 16k consists of a pair of adjacent openings 248, 250 and the lower row comprises two openings 252, 254 the shortest distance between the centers of which is equal to half the circumference of the zone bearing them less an opening width.

This distribution will enable one or other of two streams of fluid to be supplied to one or both of a pair of outlets. For example, a water supply may be connected to port 240 and a brine supply to port 242, and the ports 244, 246 may each be connected to a different treatment vat or the like. In the position shown in the drawings, brine will pass through port 242 and opening 248 into the interior of the valve member represented by contact surface 16k and will emerge through opening 252 and port 244. Clockwise rotation through one passage width, of the contact surface 16k, will close port 244 and open port 246 and a smaller rotation will partially close port 244 and partially open port 246. Rotation of contact surface 16k clockwise 180° from the position shown will connect the water inlet port 240 in a similar manner to port 246 and on further rotation in the same direction to port 244. Obviously the lower ports may be alternatively used as inlet ports and the upper ones as outlet ports. In such circumstances, the fluids supplied to ports 244 and 246 will issue unmixed or mixed through whichever one of ports 240 and 242 is co-operating with the pair of adjacent openings 248, 250.

It will be clear to those skilled in the art that there is nothing to prevent a distribution hereinbefore described as pertaining to the bearing surface from being used on a contact surface and vice versa. Thus, for example, the arrangements shown in Figs. 12, 13 and 18 may equally well be usefully applied by interchanging the distribution from the bearing to the contact surface and from the latter to the former.

I claim:

1. A valve comprising a casing and a valve body movable therein and containing a chamber, said casing having a set of ports comprising a plurality of aligned flow ports spaced apart in the direction of movement of the valve body and port means offset from said set of ports in a direction laterally of the direction of movement of the valve body, said set of ports and said offset port means being connected, one to supply means and the other to discharge means, said valve body having a set of ports comprising a plurality of aligned ports spaced apart in the direction of movement of the valve body and port means offset from said set in a direction laterally of the direction of movement of the body, all of the ports of the valve body opening into said chamber, the ports of the sets of ports in the casing and in the valve body being positioned in reverse sequence with the corresponding ports of each set having identical areas and being similarly spaced from the other ports of said set of ports, and the offset port means of the casing and valve body being similar and identically spaced with respect to the corresponding ports of the sets of ports in the respective casing and valve body so that the offset port means of the casing and valve body will simultaneously register with corresponding ports of the sets of ports of the valve body and casing respectively so that the flow through the valve is equally restricted at the inlet and outlet of said chamber.

2. A valve comprising a casing, a hollow valve body rotatably mounted therein, said casing having a set of circumferentially aligned and spaced flow ports and port means axially offset from said set of ports, said set of ports and said offset port means being connected, one to supply means and the other to discharge means, said valve body having a set of circumferentially aligned and spaced flow ports and port means axially offset from said set of ports, all of the ports of the valve body opening into said chamber, the ports of the sets of ports in the casing and in the valve body being positioned in reverse sequence with the corresponding ports of each set having identical areas and being similarly spaced from the other ports of said set of ports, and the offset port means of the casing and valve body being similar and identically spaced with respect to the corresponding ports of the sets of ports in the respective casing and valve body so that the offset port means of the casing and valve body will simultaneously register with corresponding ports of the sets of ports of the valve body and casing respectively so that the flow through the valve is equally restricted at the inlet and outlet of said chamber.

3. A valve comprising a tubular casing, a hollow valve body axially slidably mounted in said casing, said casing having a set of axially aligned and spaced flow ports, and port means laterally offset from said set of ports, said set of ports and said offset port means being connected, one to supply means and the other to discharge means, said valve body having a set of axially aligned and spaced ports and port means laterally offset from said set of ports, all of the ports of the valve body opening into said chamber, the ports of the sets of ports in the casing and in the valve body being positioned in reverse sequence with the corresponding ports of each set having identical areas and being similarly spaced from the other ports of said set of ports, and the offset port means of the casing and valve body being similar and identically spaced with respect to the corresponding ports of the sets of ports in the respective casing and valve body so that the offset port means of the casing and valve body will simultaneously register with corresponding ports of the sets of ports of the valve body and casing respectively so that the flow through the valve is equally restricted at the inlet and outlet of said chamber.

JOSÉ JUAN CORDOVA.